(12) United States Patent
Von Ballmoos et al.

(10) Patent No.: US 8,528,260 B2
(45) Date of Patent: Sep. 10, 2013

(54) STRUCTURE HAVING AN AIR CHAMBER

(75) Inventors: Roland Von Ballmoos, Erlenbach (CH); Laszlo Kerekes, Zürich (CH); Dragan Radanovic, Wetzikon (CH); Andreas Gühmann, Pfaffhausen (CH); Iris Suter, Gränichen (CH)

(73) Assignee: Lantal Textiles, Langenthal (CH)

( * ) Notice: Subject to any disclaimer, the term of this patent is extended or adjusted under 35 U.S.C. 154(b) by 419 days.

(21) Appl. No.: 12/596,304

(22) PCT Filed: Apr. 4, 2008

(86) PCT No.: PCT/CH2008/000153
§ 371 (c)(1),
(2), (4) Date: Jan. 13, 2010

(87) PCT Pub. No.: WO2008/124956
PCT Pub. Date: Oct. 23, 2008

(65) Prior Publication Data
US 2010/0140401 A1 Jun. 10, 2010

(30) Foreign Application Priority Data

Apr. 17, 2007 (CH) ....................... 0631/07

(51) Int. Cl.
| | |
|---|---|
| *E04B 1/34* | (2006.01) |
| *E04G 11/04* | (2006.01) |
| *E04H 15/20* | (2006.01) |
| *A47C 7/00* | (2006.01) |
| *A47C 19/00* | (2006.01) |
| *B60N 5/00* | (2006.01) |
| *B61D 1/00* | (2006.01) |
| *B63B 29/10* | (2006.01) |

(52) U.S. Cl.
USPC ............... 52/2.11; 52/2.22; 52/2.23; 5/9.1; 105/316; 114/192; 244/118.5

(58) Field of Classification Search
USPC ............. 52/2.11, 2.12, 2.22, 2.23, 2.16, 2.17; 244/118.6, 118.5; 105/314, 316; 5/9.1; 114/192
See application file for complete search history.

(56) References Cited

U.S. PATENT DOCUMENTS

| | | | | | |
|---|---|---|---|---|---|
| 2,960,292 | A | * | 11/1960 | Pitta ........................... | 244/118.5 |
| 3,629,875 | A | * | 12/1971 | Dow et al. ................... | 4/599 |
| 4,040,210 | A | * | 8/1977 | Land ............................ | 52/2.12 |
| 4,255,907 | A | | 3/1981 | Lightell | |
| 5,097,548 | A | * | 3/1992 | Heck et al. .................. | 5/482 |
| 5,305,561 | A | * | 4/1994 | Goddard ...................... | 52/2.22 |

(Continued)

FOREIGN PATENT DOCUMENTS

| | | |
|---|---|---|
| DE | 19 18 240 A1 | 10/1970 |
| FR | 2 188 007 A | 1/1974 |
| GB | 1 465 698 A | 2/1977 |

*Primary Examiner* — Andrew Triggs
(74) *Attorney, Agent, or Firm* — Birch, Stewart, Kolasch & Birch, LLP

(57) ABSTRACT

The invention comprises a structure having at least two separate air chambers (7) enclosed by flexible, flat material (8) and having flexible bars (9) in the interior thereof for stabilizing an external shape of the air chambers (7). The structure is characterized in that the air chambers (7) form a wall structure (4) in the inflated state. By means of such a wall structure (4)—preferably in conjunction with a corresponding ceiling structure (16)—lightweight berths (1), particularly for aircraft crew, flight passengers, or transported injured persons, can be set up quickly and simply.

9 Claims, 2 Drawing Sheets

(56) References Cited

U.S. PATENT DOCUMENTS

| | | | |
|---|---|---|---|
| 5,429,851 A * | 7/1995 | Sallee | 428/71 |
| 5,813,172 A | 9/1998 | McNally | |
| 6,467,221 B1 * | 10/2002 | Bigelow | 52/2.17 |
| 7,513,457 B2 * | 4/2009 | Schalla et al. | 244/118.5 |
| 7,992,678 B2 * | 8/2011 | Pilaar | 181/284 |
| 8,210,478 B2 * | 7/2012 | Smith | 244/135 R |
| 2006/0022087 A1 * | 2/2006 | Defilla et al. | 244/118.5 |
| 2006/0257600 A1 * | 11/2006 | Pilaar | 428/35.2 |
| 2010/0140401 A1 * | 6/2010 | Von Ballmoos et al. | 244/118.6 |

\* cited by examiner

STRUCTURE HAVING AN AIR CHAMBER

TECHNICAL DOMAIN

The invention relates to a construction comprising at least two separate air chambers which are enclosed by flexible flat material and which in their interior have flexible crosspieces for stabilization of the outside shape of the air chambers.

PRIOR ART

Aircraft crews, on long flights such as for example intercontinental routes, must take sleep breaks during the flight. For this purpose in the corresponding aircraft there are berths for crew members. In the past, honeycomb structures which separated individual berths from one another were used to prepare these berths.

Since the aircraft interior is only outfitted after completion of the fuselage and at the individual wishes of the customer, it is of special importance for this purpose that subsequent outfitting of the aircraft can be done easily and quickly. The materials used in doing so must be as light as possible for economically profitable operation of the aircraft.

Honeycomb structures have the disadvantage that they are complex to install. The walls between the individual berths must be brought through the aircraft door to the sites assigned to them and mounted there.

DESCRIPTION OF THE INVENTION

The object of the invention is to devise a construction which belongs to the initially mentioned technical domain and which can be easily and quickly installed.

The object is achieved by the features of claim 1. As claimed in the invention, a construction with at least one air chamber which is enclosed by flexible flat material and which in its interior has flexible crosspieces for stabilization of the outside shape of the air chambers is characterized in that the air chamber in the inflated state forms a wall structure. In particular an aircraft can have one or more such constructions, for example as a subdivision of a space, such as for example sleeping berths or resting berths. Here it is sufficient that a single layer of a flexible flat material forms the jacket, i.e. the boundary of the air chambers.

A wall structure consisting of this construction can be installed much more quickly and easily than existing honeycomb structures. In the uninflated state a wall structure consisting of this construction can be moved extremely easily into the interior of the aircraft and can be inflated there. In the inflated state the construction creates a wall structure which forms a stable and sound-absorbing partition between individual berth places. A pneumatic berth as can be produced from the described construction is moreover lighter than conventional honeycomb structures.

Preferably this construction is used to produce a berth for crew members or passengers, for separation of individual compartments or for briefly preparing a compartment for transport of patients in an aircraft. Interchangeable subdivisions or partitions are also possible. A pneumatic construction as claimed in the invention can also be used as a lounger in a berth.

Alternative applications are possible in shipbuilding, in the interior set-up of motor homes or railways, or in similar applications.

Preferably the air chambers in the inflated state form a self-supporting three-dimensional structure with side walls and ceiling. The ceiling structure proper in the inventive manner enables production of a completely closed berth unit. This berth can be used very flexibly in the aircraft fuselage and need not be rigidly joined to the interior of the aircraft. Moreover these berths can also be made as self-contained units which are not specially adapted to the respective space conditions of the passenger cabin. In addition to executing the ceiling as an inventive air chamber structure the wall structure of this berth preferably has four air chambers which form the wall structure in the form of a rear wall, a front wall and two side walls. The front wall is preferably provided with an entry opening.

Alternatively a berth is conceivable with side walls which are formed by a wall structure as claimed in the invention, whose ceiling however does not extend back to this structure, but is formed for example by the ceiling of the passenger cabin.

Furthermore the ceiling preferably comprises at least one other air chamber. The use of air chambers has an especially favorable sound-absorbing effect and is therefore suitable for building berths.

Alternatively other ceiling elements are conceivable, such as stretching a single or multilayer film or a stiff plane, for example a plate, which has been applied to the wall structure. In particular the conventionally used honeycomb structures can be used as ceiling elements in conjunction with the wall structures as claimed in the invention.

Furthermore one embodiment is preferred which is characterized in that at least one air chamber which forms the ceiling is connected by at least one seam to the air chamber or chambers which form the wall structure. This joining of the ceiling to the wall structure advantageously leads to the transitions between the ceiling part and the individual wall parts being made secure and sound-absorbing. A continuous seam offers high stability of the entire structure due to the fixed inner connection between the wall structure and the ceiling. The seam, in addition to an execution as a weld seam, can also be implemented for example by an reclosable connecting means, such as a zipper, velcro strip or similar connecting means. In particular, each of the air chambers can be equipped with flaps which run along their edge and which can be joined to the flaps of the air chambers bordering at the time, for example by means of a zipper. When using velcro connections the strips of flaps can also be omitted.

Of course there can also be connecting means (snap fasteners, zippers, velcro strips, etc.) at any locations of a wall structure as claimed in the invention in order to form two parts of the construction.

Alternatively the ceiling can also be joined to the wall structure in spots. In this way there is a fixed connection between the wall structure and the ceiling, the intermediate spaces between the spot connections having an adverse effect on sound absorption.

In another preferred embodiment the air chambers consist of a translucent material. This material makes it possible for example for a light beam which has been coupled into the air chambers to penetrate the latter. Here, on the respective border of the air chambers light can be emitted into their vicinity by scattering on the translucent surface of the chambers. In this way the immediate vicinity of the air chambers can be very elegantly illuminated by indirect scattered light. The crosspieces in this preferred embodiment run parallel to one another and essentially in the vertical direction so that light which radiates from underneath through the air chamber is not further attenuated by the crosspieces.

Alternatively the translucent configuration of the wall structure can be omitted. For example it can be advantageous for static reason to arrange the crosspieces horizontally, diagonally or as a general mixture of vertical and horizontal alignment.

Preferable this construction has a floor shell with upright wall shoulders on which the wall structure can be subsequently mounted.

Alternatively it is also conceivable for the wall structure to be mounted directly on a floor. The wall structure as claimed in the invention can also conceivably be mounted on existing wall structures.

Preferably the air chambers which form the wall structure with their upper face sides abut the bottom of at least one other air chamber which forms the ceiling so that light can be coupled into the ceiling. This embodiment enables structurally simple illumination of the berth. A light beam conducted through the wall structure into the ceiling can be routed in the ceiling and can be decoupled out of it, for example by scattering. The path of the light path can therefore be controlled in the wall structure in an elegant and technically simple manner.

The wall structure and ceiling can also be triggered by way of different lighting means, so that selective illumination of the berth, for example in the form of individually illuminated air chambers, is enabled. Thus the necessity of a complicated electrical installation for illuminating the berth is obviated since the actual lighting can be inlet for example in the deck of the passenger cabin or in the deck shell and only the light emitted from this lighting need be conducted in the aforementioned manner into the berth in order to supply the berth fully with light.

Alternatively direct conduction of light within the wall structure can be omitted. To enable illumination of the berth as claimed in the invention, on the one hand cabling of the wall structure and the ceiling adjoining it is recommended. On the other hand, direct power supply of the lighting within the berth can be accomplished from the ceiling region of the passenger cabin. A transparent part of the ceiling in conjunction with lighting located over the transparent part can also provide sufficient light to the berth. In addition, within the berth it is also possible to install a light which is supplied with current on the floor side. This applies especially also to the use of a floor shell with an already premounted light.

Preferably the air chambers of the wall structure and of the ceiling can be pressurized with a relative pressure of <150 mbar, especially 50-90 mbar. The relative pressure is defined as the overpressure relative to the ambient pressure, especially an overpressure relative to the air pressure which is prevailing in the passenger cabin and which is fixed by the aircraft-side compressors of the pressurized cabin. At a relative pressure of this magnitude the sound absorbing action of the wall structure or the ceiling is especially efficient. When using the invention in aircraft the relative pressure is produced especially preferably by coupling to the aircraft-side compressor system.

Preferably there is a possibility for controlling the pressure in the wall structure. Control can be enabled with a throttle valve locally on the construction (for example on the berth) in order to manually or automatically set the pressure which has been made available by the compressor system of the aircraft. The pressure can however also be controlled by a control circuit which is located for example centrally in the cockpit or at another suitable location for all existing wall structures.

When using high relative pressures, higher stability of the wall structure can be achieved. But it has the disadvantage that the sound absorption of the wall structure described here decreases rapidly at relative pressures which are much higher than 90 mbar (specifically more than 150 mbar). A much higher pressure here means a pressure which differs by at least one order of magnitude from its reference pressure.

When using the construction as a berth there can preferably be a pneumatic lounger in the berth. Advantageously a pneumatic lounger has a much longer service life than a conventionally used foam lounger. The pneumatic lounger can be advantageously connected to the same pressurized air system which also feeds the wall structure of the subdivision with pressurized air.

Other advantageous embodiments and combinations of features of the invention will become apparent from the following detailed description and the totality of the claims.

BRIEF DESCRIPTION OF THE DRAWINGS

The drawings used to explain the exemplary embodiment show the following.

EMBODIMENTS OF THE INVENTION

Figure 1:
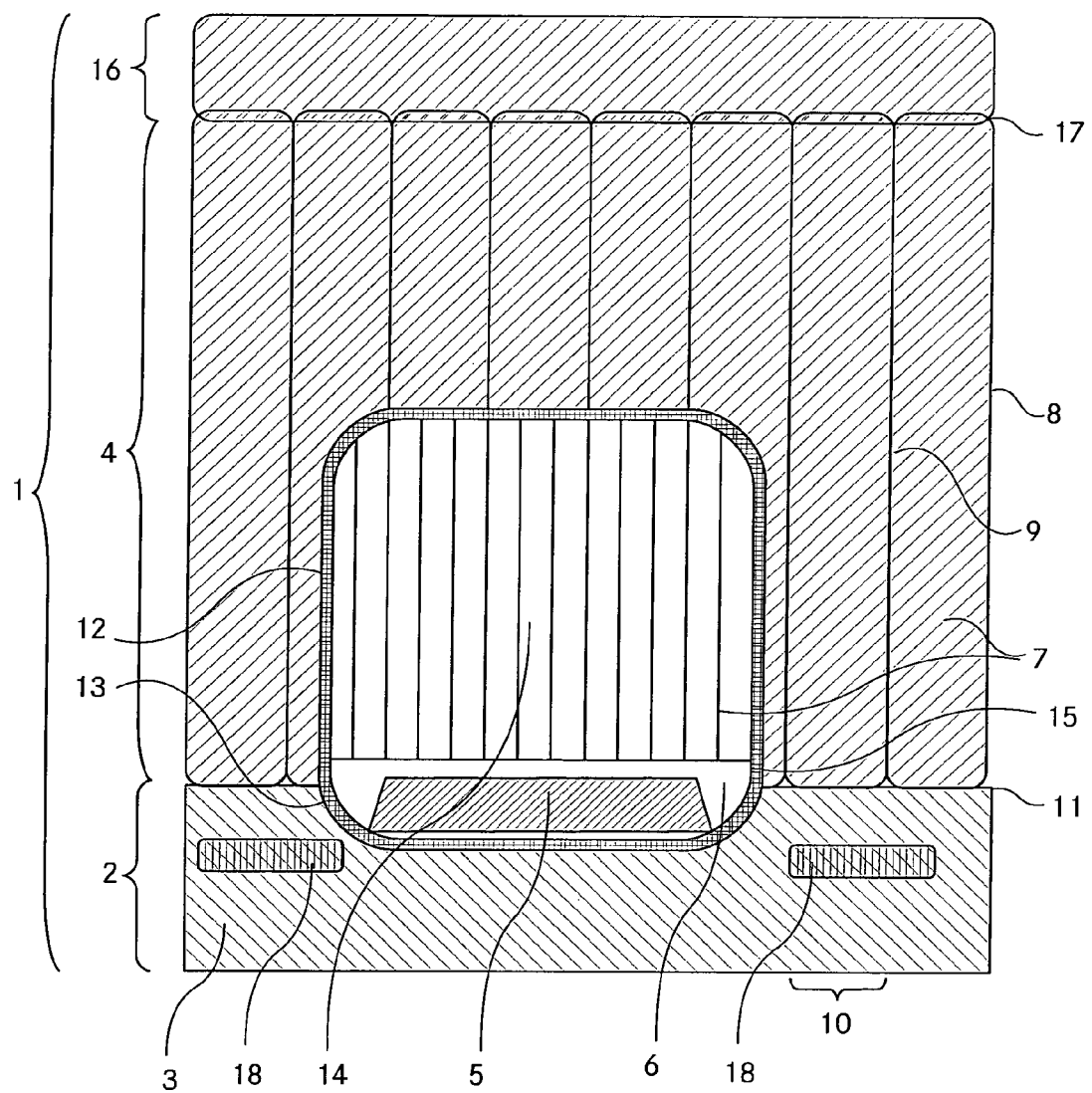
FIG. 1 shows a side view of a sleeping berth, including the construction as claimed in the invention

The sleeping berth 1 shown in FIG. 1 comprises a floor shell 2 with upright wall shoulders 3 on which a wall structure 4 is mounted. The floor shell 2 is essentially of a rectangular base area, is made of strong material and is generally suitable for installation on floor surfaces. In it is the actual sleeping site in the form of a reclining surface 5 with cushioning 6 which surrounds it. The cushioning 6 for its part is matched to the external shape of the floor shell 2 and thus forms a type of trough at whose low point the lounge 5 is located. When used in aircraft this trough-shaped structure of the deck shell 2 is advantageous because possible sudden changes of the position of the aircraft due to turbulence can only throw a person lying in the sleeping berth out of it with difficulty.

The floor shell 2 with its upright wall shoulders 3 is adjoined by a wall structure 4. The wall structure 4 is formed by four air chambers 7 which are enclosed by a film 8 and in their interior have flexible crosspieces 9 for stabilization of their external shape. The flexible crosspieces 9 are made at least partially permeable to air so that air exchange between the individual compartments of the air chambers is possible. The crosspieces 9 hold the film 8 of the wall structure in a predefined shape. The mutual distance 10 of the crosspieces 9 is preferably proportional to the thickness of the wall structure 4. Preferably the distance 10 changes with varying wall thickness. Typically the mutual distance of the crosspieces is smaller than the wall thickness prevailing at the location of the crosspiece.

The crosspieces 9 of the wall structure 4 are vertically aligned. The wall structure 4 is connected to the floor shell 2, the connection 11 being formed by a zipper.

The shape of the wall structure 4 is determined essentially by the arrangement and shape of the individual air chambers 7. The smaller the individual air chambers 7, the more complex the shape elements which can be produced by combining these air chambers 7.

The floor shell 2 and also the wall structure 4 each have one recess 12, 13 on their edge. The two recesses 12, 13, are dimensioned such that in the combined state they form an entry opening 14 for the sleeping berth 1. This entry opening 14 is surrounded by a frame 15 which stabilizes the opening 14 and attachment surfaces for example for a curtain or similar space separating element. In this way the interior of the sleeping berth 1 can be closed off to outside inspection.

The wall structure 4 is connected to a ceiling 16 which likewise consists of a plurality of air chambers and which is connected via weld seams 17 to the wall structure 4. This fixed connection between the ceiling 16 and the wall structure 4 yields increased strength to the overall structure of the sleeping berth 1 and especially the wall structure 4. The ceiling 16 is made of the same film material as the wall structure 4.

The embodiment shown in FIG. 1 is additionally characterized in that in the floor shell 2 lighting means 18 are attached whose light is injected through the lower face side of the wall structure 4 and on the upper face side of the wall structure 4 is coupled into the ceiling 16. By way of the film of the wall structure 4 or of the ceiling 16 the light of the lighting means 18 is routed essentially uniformly into the interior of the sleeping berth 1 so that the wall structure 4 and ceiling 16 themselves act effectively as lights.

Figure 2:
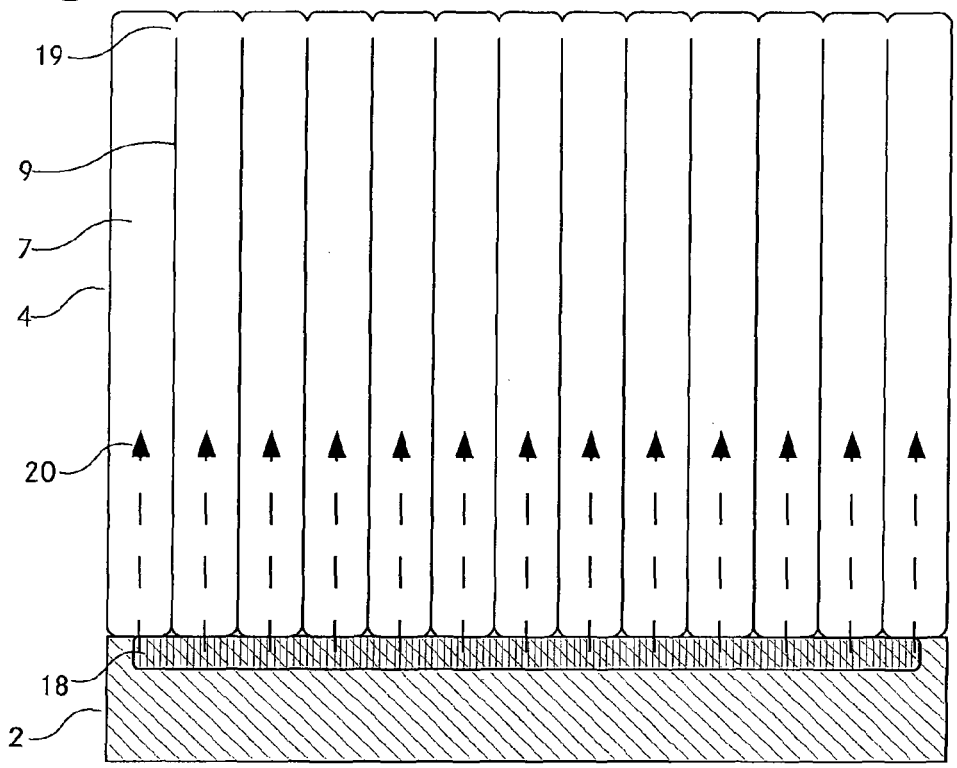
FIG. 2 shows a cross section of a sleeping berth, including the construction as claimed in the invention

FIG. 2 shows the floor shell 2 in which lighting means 18 are held. The light 20 of the lighting means 18 is coupled into the translucent air chambers 7 and routed through them. Since the crosspieces 9 run essentially vertically, the light can propagate through from the lower part of the wall structure 4 to its upper part without noticeable losses. The crosspieces 9 which form the air chambers 7 are at least partially permeable to air. In the embodiment from FIG. 2 openings 19 are made in the crosspieces and enable air exchange between all air chambers 7.

Figure 3:
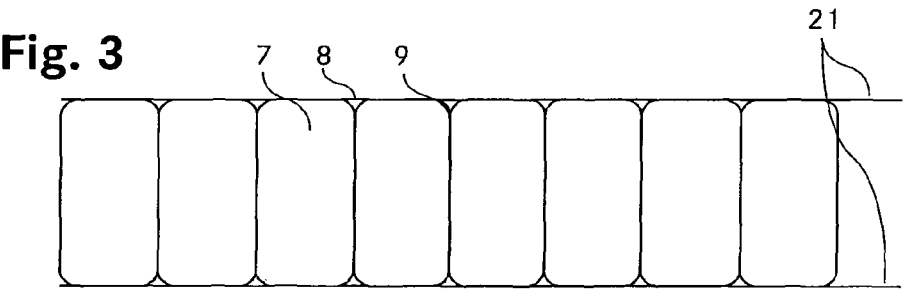
FIG. 3 shows a top view of an air chamber with attachment flaps

FIG. 3 shows a top view of an air chamber 7 with the crosspieces 9 contained in it. The air chamber 7 is surrounded by a film 8. Furthermore, on each side of the air chamber 7 flaps 21 are attached to the film 8 and are used for connection between two air chambers. For example zippers, weld seams or velcro closures can be attached to the flaps 21 in order to connect several air chambers into a wall structure.

Figure 4:
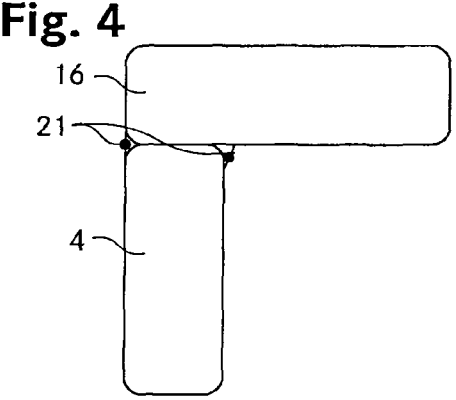
FIG. 4 shows a cross section of a connection between the air chamber of a wall structure and the air chamber of the ceiling

FIG. 4 shows a cross section of a connection between the air chamber of a wall structure 4 and the air chamber of a ceiling 16. Between the air chambers, on each side of the latter a flap 21 is attached and holds the air chambers together. The ceiling 16 is applied to the wall structure 4 such that it rests with the bottom on the face side of the wall structure 4. In this way light can be coupled out of the wall structure into the ceiling 16.

Figure 5:
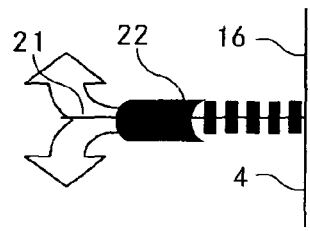
FIG. 5 shows a schematic of a zipper which connects the flaps of adjacent air chambers to one another Fundamentally the same parts are labelled with the same reference numbers in the figures.

FIG. 5 shows a schematic of a zipper 22 which connects the flaps 21 of two adjacent air chambers, for example one air chamber of the wall structure 4 and one air chamber of the ceiling 16, to one another. Alternatively to the use of a zipper the flaps can be connected to one another for example by weld seams or velcro closures.

The wall structure 4 which is shown in FIG. 1 and which has been placed on the floor shell 2 can also be connected to the floor shell 2 with other fasteners, such as for example a weld seam or a velcro closure. It applies analogously to the connection between the wall structure 4 and ceiling 16 that in addition to an implementation as a weld seam it can also be made as a zipper or velcro closure.

The sleeping berth 1 need not be made as a wall structure 4 mounted on a floor shell 2, with a ceiling 16, but can likewise be directly attached on the deck of the passenger cabin or over a seat location or recliner.

Illumination of the sleeping berth 1 can also take place alternatively to illumination via light coupled into the wall structure 4 by conventional direct lighting, for example by a lamp installed in the floor shell 2.

In summary it can be stated that the invention makes available an inflatable construction with air chambers which enables rapid and simple as well as lightweight execution of a self-supporting three-dimensional structure, especially for use in aircraft such as for example jumbo airliners. The construction as claimed in the invention allows good sound absorption and simple conduction of light into its interior.

The invention claimed is:

1. A construction comprising at least two air chambers which are enclosed by flexible flat material, wherein flexible crosspieces for stabilization of the outside shape of the at least two air chambers are arranged within the interior of each air chamber, and wherein at least one of the at least two air chambers in the inflated state forms a wall structure and the at least one other of said at least two air chambers forms a ceiling, and wherein the at least two air chambers in the inflated state form a self-supporting three-dimensional structure with side walls and ceiling, which in the inflated state forms a sleeping or resting berth for use in an aircraft, wherein the at least one air chamber forming the wall structure abuts the bottom of the at least one other of said at least two air chambers forming the ceiling with the upper face side, wherein the at least two air chambers consist of a translucent material such that light is emitted through said wall structure into said ceiling.

2. The construction as claimed in claim 1, wherein the at least two air chambers comprise at least four separate air chambers that are plate-shaped.

3. The construction as claimed in claim 2, wherein the ceiling comprises at least one additional air chamber.

4. The construction as claimed in claim 1, wherein the at least one air chamber which forms the ceiling is connected by at least one seam to the at least one air chambers which forms the wall structure.

5. The construction as claimed in claim 1, wherein the flexible crosspieces in the at least two air chambers run essentially in the vertical direction.

6. The construction as claimed in claim 1, wherein the at least two air chambers are pressurized with a pressure of up to 150 mbar.

7. The construction as claimed in claim 6, wherein the at least two air chambers are pressurized with a pressure of 50-90 mbar.

8. The construction as claimed in claim 1, further comprising a floor shell with an upright wall shoulder onto which the wall structure is subsequently mounted.

9. An aircraft comprising a berth including at least one installed construction as claimed in claim 1.

* * * * *